C. G. McCUTCHEN.
MOTOR TRUCK.
APPLICATION FILED JULY 18, 1917.
1,342,752.
Patented June 8, 1920.
2 SHEETS—SHEET 1.
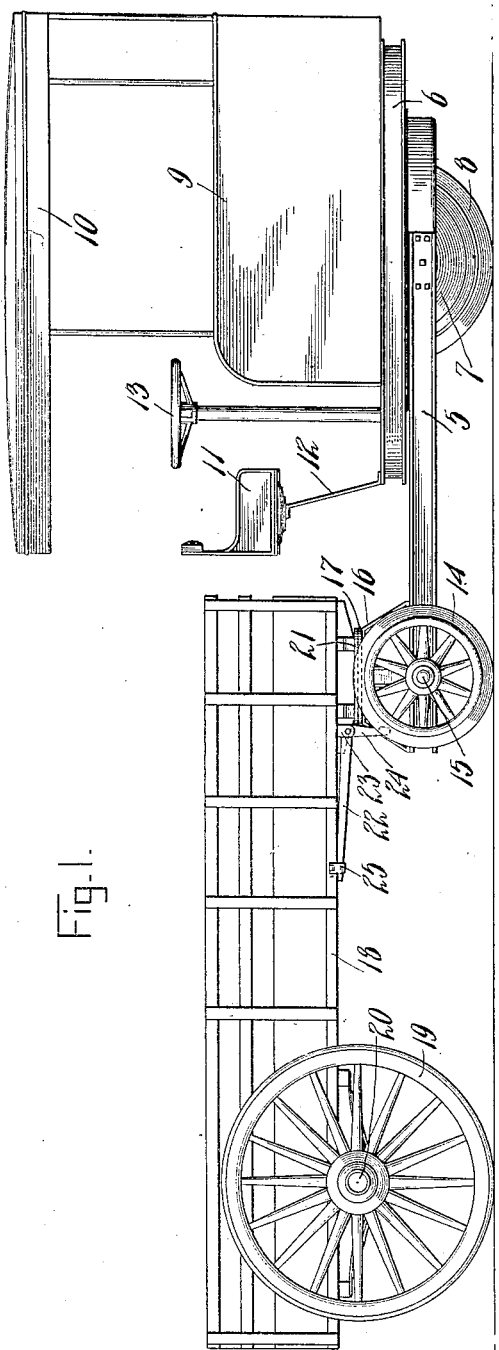
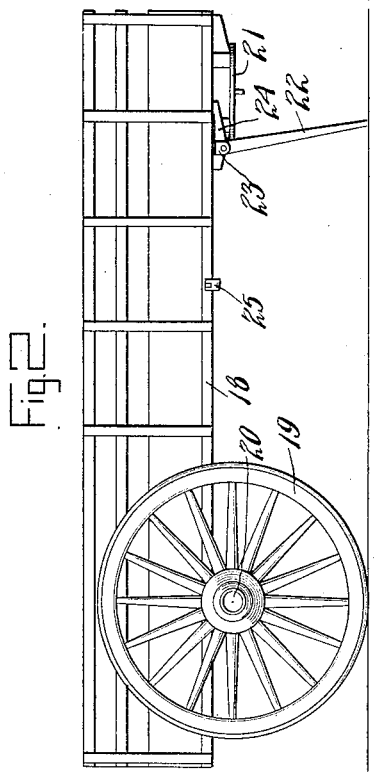
Inventor
Charles G. McCutchen
By Bradford & Doolittle
Attorneys

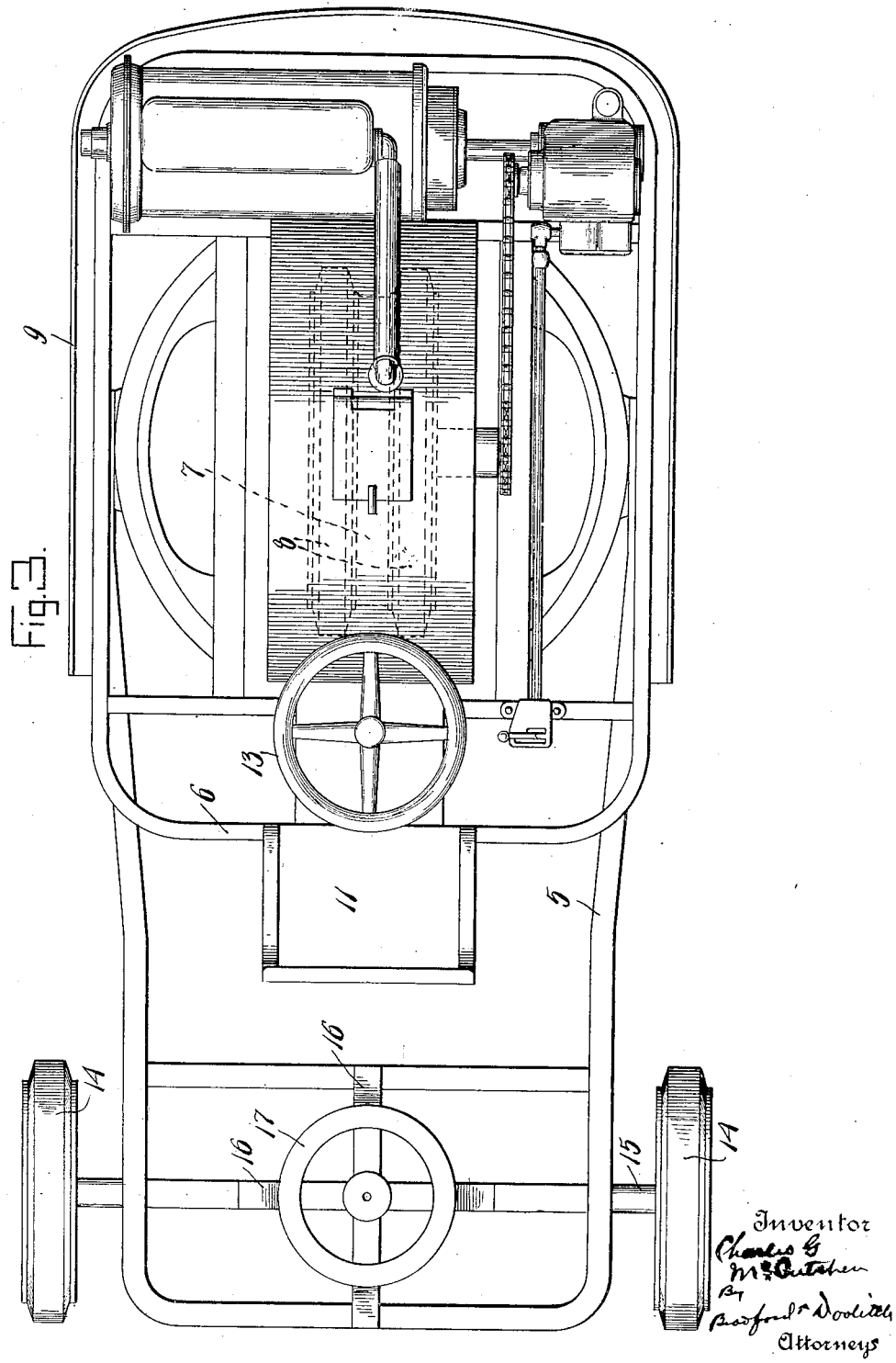

UNITED STATES PATENT OFFICE.

CHARLES G. McCUTCHEN, OF INDIANAPOLIS, INDIANA, ASSIGNOR TO THE HIGHWAY TRACTOR COMPANY, OF INDIANAPOLIS, INDIANA, A CORPORATION OF INDIANA.

MOTOR-TRUCK.

1,342,752.      Specification of Letters Patent.      Patented June 8, 1920.

Application filed July 18, 1917. Serial No. 181,201.

*To all whom it may concern:*

Be it known that I, CHARLES G. MC-CUTCHEN, a citizen of the United States, residing at Indianapolis, Marion county, and State of Indiana, have invented and discovered certain new and useful Improvements in Motor-Trucks, of which the following is a specification.

My said invention relates to motor propelled vehicles and consists in the combinations and arrangements of elements hereinafter described and particularly set forth in the accompanying claims.

The purpose of the invention is to provide a vehicle comprising a motor driven tractor unit and a load carrying unit, or trailer, wherein the arrangement is such that the tractor unit may be readily connected with or disconnected from the load carrying unit to the end that the tractor may be separately employed during the time consumed in loading or unloading the carrying unit.

The invention has for its further purpose to provide a tractor of this type having a single tractor wheel journaled on a revoluble section in the chassis or frame of the tractor, and with the operator's seat, motor, transmission, steering gear, and all controls therefor, also mounted thereon to enable the tractor with its trailer to be turned or steered in any direction with the driver always facing the direction of travel, or backed with the driver facing the load.

Another object of the invention is to construct a tractor unit of this type having a pair of permanent ground engaging wheels that will serve in place of one pair of the usual load carrying wheels of the trailer, to the end that those wheels may be omitted from the trailer or load carrying vehicle; and to the further end that the tractor unit may constitute a vehicle complete in itself and thereby have completely independent usage.

The invention is shown by way of illustration in the accompanying drawings, wherein;

Figure 1 is a side elevation showing the vehicle with both units coupled as when ready for moving, Fig. 2 a side elevation of the load carrying unit uncoupled, and Fig. 3 a top or plan view of the tractor unit.

Referring to the construction in further detail and wherein like reference characters designate corresponding parts, the vehicle consists of a tractor unit or section, complete and independent in itself, and an independent load carrying or trailer section adapted to be coupled to the tractor unit for hauling, but readily uncoupled therefrom, as during the period of loading or unloading.

The tractor unit consists of a chassis or frame 5 constructed preferably of angle iron and re-enforced and braced to give great stability. A revoluble section 6 suitably mounted within or on the chassis 5 has journaled therein a single tractor wheel 7 of a type appropriate for supporting heavy loads, and preferably of the heavy truck type having a dual tire 8. A suitable frame in the revoluble section has mounted thereon the motor supports, a tractor motor, and transmission, together with the necessary auxiliaries therefor, and said elements are suitably inclosed within a casing or housing 9 having a cover or top 10. A seat 11 for the driver is mounted on a support 12 on the revoluble section, and the steering control 13 also mounted thereon, enables the operator to always face the direction of travel of the vehicle and to face the trailer while the same is being backed, loaded or unloaded. In this connection reference may be had to copending application Serial No. 83,449 dated March 11, 1916.

In said application many of the novel features of and advantages for this particular type of tractor are fully disclosed and described in detail.

A pair of ground engaging and load supporting wheels 14 are journaled on an axle 15 mounted in one end of the chassis 5 of the tractor unit and said wheels, together with the wheel 7, and chassis make the tractor unit a complete and independent vehicle, adapted to travel independently or to haul a load carrying trailer. The axle 15 is fixedly mounted on the chassis 5, *i. e.* said axle is not adapted for steering, and a frame or spider 16 is mounted on the chassis directly over the axle and carries one element 17 of a fifth-wheel steering head of the usual construction.

The load carrying unit or section of the vehicle consists of a body 18 of any suitable type and having a pair of load carrying wheels 19 journaled on an axle 20 at one end as shown. The usual front pair of steering wheels for the vehicle 18 is omitted and the top element 21 of the fifth-wheel is fixed on bolsters under the front end thereof and adapted to be swivelly connected to the element 17 thereof by an ordinary king bolt.

The pair of wheels 14 of the tractor unit thus carries the front end of the load carrying unit and serve in place of the omitted pair of front wheels. Said wheels 14 are thus utilized both as supporting wheels for the tractor unit and load carrying wheels for the other unit, and also as the steering connection between both units of the vehicle.

The front end of the vehicle body 18 is adapted to be temporarily supported, i. e. at the times of loading and unloading, by a pair of legs or props 22 pivotally mounted in suitable brackets 23 on the under side of the vehicle body (see Fig. 2), and each of said props has a laterally extended brace member 24 adapted to engage against the under-side of the vehicle body after the manner shown. A pair of suitable supports 25 is mounted on the under side edges of the body 18 and adapted to engage with the free ends of the supporting members 22 when said members are not in use, e. g. when the body 18 is connected to the tractor unit of the vehicle.

It will therefore be seen from the foregoing that a load carrying vehicle is provided wherein a service of the highest flexibility and variety may be maintained to the end that the tractor unit,—the essential element of the combination—may be employed to its fullest advantage and without regard to the use to which the load carrying vehicle may be put. And it will be further noted that the vehicle as a whole may be readily controlled by the operator and that both units thereof are free for complete turning within an area of comparatively small limits with regard to the over-all length of the vehicle.

It is obvious that those skilled in the art may vary the details of construction and arrangement of parts without departing from the spirit of the invention, and therefore I do not wish to be limited to such features except as may be required by the claims.

Having thus fully described my invention what I claim as new and desire to secure by Letters Patent, is:

A motor truck embodying a load-carrying unit having rear wheels and one-half of a fifth wheel at the forward end, a tractor unit embodying a U-shaped frame, a tractor wheel mounted to swivel between the members of the frame, a dead axle extending across and spaced from the closed end of the U-frame, wheels journaled upon the dead axle, a brace extending across the frame spaced from the axle and in parallelism with the axle and frame end, a spider having two of its legs secured at spaced points upon the axle and two other legs secured to the frame-end and the brace respectively, said spider so constructed standing above the plane of the axle and frame, a fifth wheel section carried by the spider complementary to the first mentioned fifth wheel section, and means to swivel the fifth wheel sections together.

In witness whereof I have hereunto set my hand and seal at Indianapolis, Indiana, this 9th day of July, A. D. nineteen hundred and seventeen.

CHARLES G. McCUTCHEN. [L. S.]

Witnesses:
 E. W. BRADFORD,
 M. L. SHULER.